T. J. Hall.

Gang Plow.

No. 3,716. Reissued Nov. 9, 1869.

N. PETERS, PHOTO-LITHOGRAPHER, WASHINGTON, D. C.

UNITED STATES PATENT OFFICE.

THOMAS J. HALL, OF BRYAN, TEXAS.

IMPROVEMENT IN GANG-PLOWS.

Specification forming part of Letters Patent No. 12,791, dated May 1, 1855; extended seven years; reissue No. 3,716, dated November 9, 1869.

*To whom it may concern:*

Be it known that I, THOMAS J. HALL, of Bryan, in the county of Brazos, in the State of Texas, did invent certain new and useful Improvements in Gang-Plows, and obtained Letters Patent therefor, which patent is dated May 1, 1855, and that I, the said THOMAS J. HALL, now of Bryan, in the county of Brazos, in the State of Texas, am the sole owner of the entire patent; and I hereby declare that the following amended specification is a full and exact description of the invention, reference being had to the accompanying drawings and to the letters of reference marked thereon.

Figure 1:
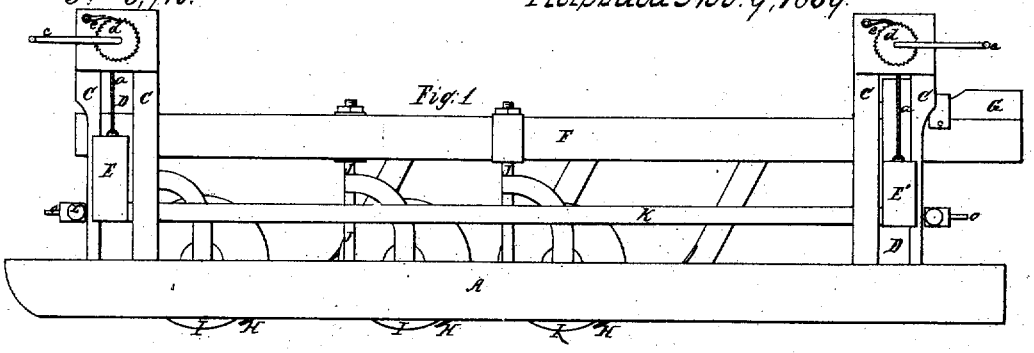
Figure 3:
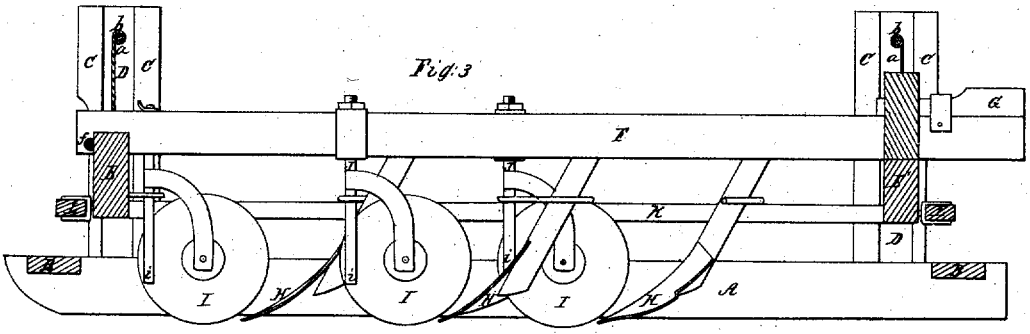
Figure 2:
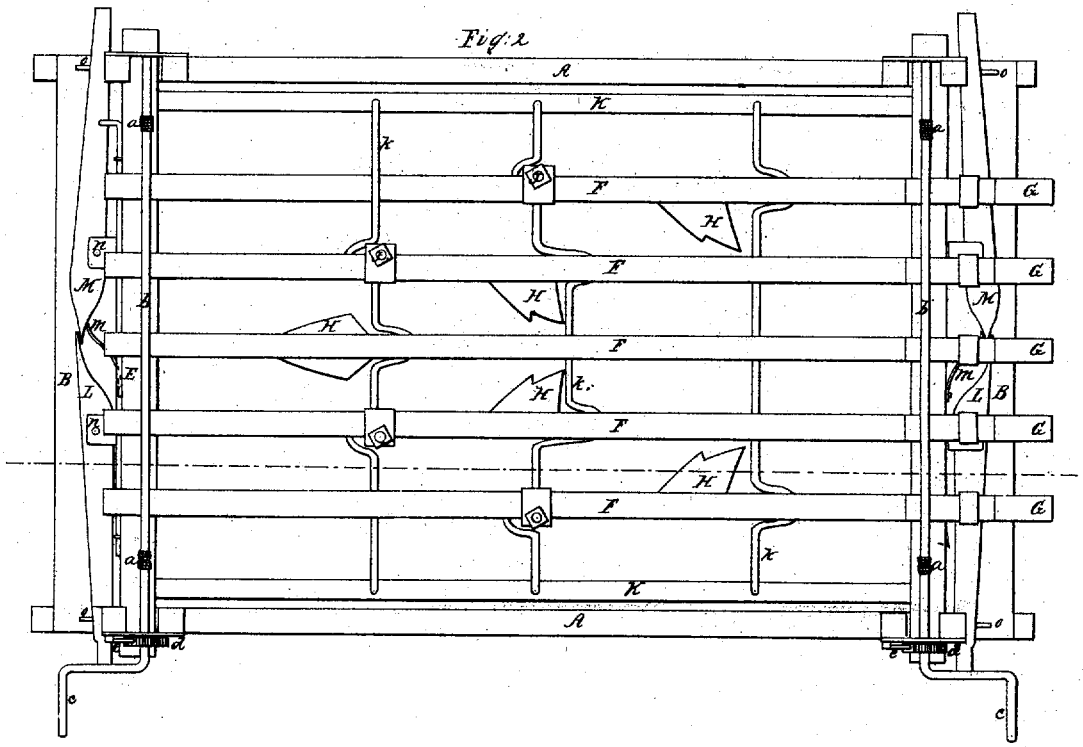

Figure 1 represents a side elevation of the machine. Fig. 2 is a plan view of same, and Fig. 3 is a longitudinal vertical section through line *x x* of Fig. 2.

Similar letters in the several figures denote like parts.

My invention consists in so constructing and arranging a gang or series of plows in one frame that they may have an adjustment on the supporting-runners, and a means of self-adjustment vertically, so that they may be set for furrow-slices of any given depth, and any one of the series may give way to an undue resistance in the line of the furrow without disturbing any others of the plows. It also consists in a means of limiting the horizontal or lateral vibration of the revolving colter or cutter disk.

In order to enable others skilled in the art to make and use my invention, I will describe the same with reference to the drawings.

A A are two substantial runners, for supporting the entire plow or series of plows, preferring runners to wheels, for the reason that they will not dip into depressions in the ground, and thus allow the plows to run into the ground beyond their stipulated depth. B B are front and rear cross-pieces, for uniting the two runners, and thus making a firm frame for supporting the gang of plows. Near each of the four corners of the frame thus made are framed in the uprights C C C C, &c., so as to leave a slot, D, or opening between them, in which work, transversely of the frame, the two beams E E′, which are suspended, by cords or chains *a*, to a shaft or shafts, *b b*, suitably arranged on top of the uprights C. On the ends of these shafts are placed cranks *c*, and near the cranks a ratchet, *d*, into which a pawl, *e*, on the uprights take, so that said beams E E′ may be raised or lowered at pleasure, and held at such height as may be desired, for regulating the depth at which the plows shall run. To the front beam E is pivoted or hinged, as at *f*, Fig. 3, the series of plow-beams F F F, &c., the rear ends of said plow-beams resting in open mortises cut in the rear cross-beam E′, but so as to be free to rise should the plow which may be attached to it be thrown out of the ground. The ends of the plow-beams at the rear may be weighted with weights G, to hold them down or into the soil, and these weights may be increased or diminished, or entirely dispensed with, as the character of the soil may require. The plows H H H H, &c., of any suitable form, are hung to these beams F, and the shares of the plow or their mold-board may be so arranged as to turn all the furrows to one side, or part to one side and part to the other, as may be desired. The plows are set harrow-teeth fashion, or in any desired form or arrangement with relation to each other and the furrow to be sliced. To the beams F is also hung, in advance of the point of each plow of the series, a disk-cutter, I, the stock J of which is swiveled in or to the said beams, and which cutters have a front support or guide, *i*, to direct their course. Braces *k* extend across from the side pieces K K, which are bent around the stem or stock J of the cutting-disk, to give additional support to the machine by binding it together transversely, thus adding much to the strength of the frame in resisting lateral or side strain. These braces *k* perform another important function. It will be observed that they are placed across the frame, on or nearly on a line through the standards or stocks J of the revolving disk; but, instead of being straight, they are bent, so as to partially surround the said stock J, and the opening between the two bent portions of the braces is farther apart than just enough to admit the stock, and the two opposite sides of the bent part of the brace are not parallel, but a little flaring, and by this construction allows the stock J to swivel freely in the beam, until the braces or arms to which the revolving disk I is attached strike the shoulders or sides of the bend in brace *k*, and limit the lateral vibration of the said revolving cutter-disk I, and prevent its making a complete revolution or a vibration laterally beyond what is necessary to keep the disk in a position to operate on the line of draft or direction that the plow is to have.

Another means of limiting the lateral vibration of the revolving cutter-disk is seen applied to the frame of the cutting-disk which precedes the forward plow, and was adopted because brace *k* could not be used to limit the lateral vibration of that cutter-disk by reason of its close proximity to the forward cross-tie of the frame of the machine, but which does not depart in its principles of operation or application to brace *k*, and is simply two iron or other pins driven into the cross-tie of the frame, one on each side of the stock J, allowing the bent arms that contain the cutting-disk to strike against the pins, producing the same effect as does the bent brace *k*, and is regarded as being the same invention. At both the front and rear of the plow-frame are two levers, L M, having their fulcra at *n*. The point of the lever L bears against the outside point of the lever M, and behind M is a spring, *m*, and in each of said levers is a pin or bolt, *o*, which passes into and through holes in the uprights C, and into the cross-beams E E′, to hold them in place when adjusted.

By taking hold of the lever, and drawing its pin *o* out of the hole, the same motion causes the lever M to draw out its pin. Then, by throwing out the pawl *e* from the ratchet *d*, and turning the crank *c*, the cross-beam may be raised or lowered at pleasure, carrying with it the series of plow-beams F, which rest on it. By this contrivance the depth of the furrow is regulated. But independent of this fixed adjustment, the plow-beams F have a self-adjustment at the rear, they only being controlled from rising too freely or too high by the weights G; and, although they may rise to yield to any obstruction, they cannot drop below a given distance—that is, lower than the cross-beam E′, and are thus prevented from allowing the plows to "run into" the soil.

Any number of plows may be used within the capacity of the team or power which draws it.

Having thus fully described the nature of my invention, I would state that I do not claim a gang of plows; nor do I claim the hanging of the plows to hinged or pivoted beams, these being well known; but

What I do claim as new, and desire to secure by Letters Patent, is—

1. The arrangement of the plows and pivoted beams with the adjustable cross-beams, so that the plows may have a convenient permanent adjustment in connection with their self-adjusting property in the plow-beam, as set forth and described.

2. Limiting the lateral vibration of the revolving cutter or colter, that it may not, when out of the ground, vibrate so far that it would not recover its true position when again in contact with the ground, substantially as described.

3. The bent brace *k*, when constructed in the form as described, and attached to the frame of the plow, in the manner and for the purpose substantially as described.

THOS. J. HALL.

Witnesses:
EDM. F. BROWN,
JNO. F. FENNELL.